(12) United States Patent
Chung et al.

(10) Patent No.: US 11,555,531 B1
(45) Date of Patent: Jan. 17, 2023

(54) CYCLOID SPEED REDUCER

(71) Applicant: Delta Electronics, Inc., Taoyuan (TW)

(72) Inventors: Chi-Wen Chung, Taoyuan (TW);
Hung-Wei Lin, Taoyuan (TW);
Wei-Ying Chu, Taoyuan (TW);
Chin-Hsiang Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/733,599

(22) Filed: Apr. 29, 2022

Related U.S. Application Data

(60) Provisional application No. 63/247,967, filed on Sep. 24, 2021.

(51) Int. Cl.
*F16H 1/34* (2006.01)
*F16H 1/32* (2006.01)

(52) U.S. Cl.
CPC ......... *F16H 1/34* (2013.01); *F16H 2001/323* (2013.01)

(58) Field of Classification Search
CPC .............................. F16H 1/34; F16H 2001/323
See application file for complete search history.

(56) References Cited

U.S. PATENT DOCUMENTS

| | | | |
|---|---|---|---|
| 8,540,599 B2 * | 9/2013 | Yao | F16H 13/08 475/176 |
| 9,051,995 B2 * | 6/2015 | Miyoshi | F16H 1/32 |
| 10,830,312 B2 | 11/2020 | Tamura et al. | |
| 11,143,278 B2 * | 10/2021 | Nakamura | F16H 37/041 |
| 2022/0107005 A1 * | 4/2022 | Takahashi | F16H 1/32 |

FOREIGN PATENT DOCUMENTS

| | | |
|---|---|---|
| CN | 206458806 U | 9/2017 |
| CN | 111895045 A | 11/2020 |
| TW | I675976 B | 11/2019 |

* cited by examiner

*Primary Examiner* — Huan Le
(74) *Attorney, Agent, or Firm* — Kirton McConkie; Evan R. Witt

(57) ABSTRACT

A cycloid speed reducer includes an input shaft, a rolling assembly, first and second cycloid discs, a crankshaft and an output disc. The first and second cycloid discs are disposed around the input shaft and driven by the input shaft. The first and second cycloid discs are located at two opposite sides of the rolling assembly, respectively. The crankshaft includes first and second eccentric ends and first and second concentric ends integrally formed as a one-piece structure and arranged sequentially. The first and second eccentric ends are linked with the first and second cycloid discs respectively. An eccentricity value is between any neighboring two of the concentric and eccentric ends. The diameters of all the concentric and eccentric ends are equal. The output disc is linked with the first or second concentric end. The output disc is a power output end of the cycloid speed reducer.

12 Claims, 8 Drawing Sheets

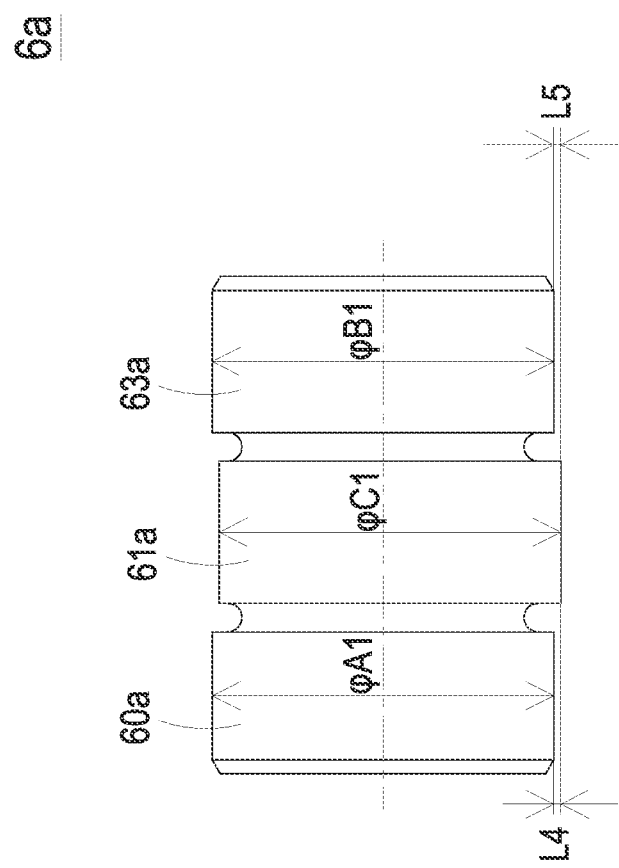

CYCLOID SPEED REDUCER

CROSS-REFERENCE TO RELATED APPLICATION

This application claims the benefit of U.S. Provisional Application No. 63/247,967 filed on Sep. 24, 2021, and entitled "POWER MODULE AND SPEED REDUCER". The entire contents of the above-mentioned patent applications are incorporated herein by reference for all purposes.

FIELD OF THE INVENTION

The present invention relates to a speed reducer, and more particularly to a cycloid speed reducer capable of being miniaturized.

BACKGROUND OF THE INVENTION

Generally, a motor is operated at a high speed and a low torque. In other words, it is difficult to use the motor to drive a large-sized load. For allowing the motor to drive a heavy object, a speed reducer is used for reducing the rotating speed of the motor and increasing the torque.

Conventionally, the speed reducers are classified into several types, including rotary vector (RV) reducers, harmonic drive reducers and cycloid speed reducers. Since the conventional cycloid speed reducer has many benefits such as large transmission ratio, compact structure and high transmission efficiency, the cycloid speed reducer has been commonly used in various fields related to motors.

Due to the eccentric motion of the cycloid disc of the conventional cycloid speed reducer, the conventional cycloid speed reducer usually includes a crankshaft. The crankshaft is linked with the cycloid disc for transmitting the output torque. In addition, the crankshaft includes at least one eccentric end and at least one concentric end. The at least one concentric end is coaxial with the crankshaft, and the at least one eccentric end is eccentrically disposed on the crankshaft. The number of the eccentric and concentric ends is determined according to the number of the cycloid disc.

However, all the eccentric and concentric ends of the crankshaft of the conventional cycloid speed reducer need to cooperate with respective bearings. For complying with requirements of the bearing assembly process, the diameters of the eccentric and concentric ends have to be limited. In specific, the diameter of the eccentric end at the inner side of the crankshaft needs to be greater than the diameter of the concentric end at the outer side of the crankshaft. The limitations of the diameters are detrimental to the miniaturization of the conventional cycloid speed reducer. Moreover, the diameters of the eccentric and concentric ends are different, and thus the bearing size matching the eccentric end and the bearing size matching the concentric end are different. Since the sizes of the bearings are different, it is unable to use the same bearing material.

Therefore, there is a need of providing an improved cycloid speed reducer in order to the overcome the drawbacks of the conventional technologies.

SUMMARY OF THE INVENTION

An object of the present invention provides a cycloid speed reducer to address the issues encountered by the traditional cycloid speed reducer such as not conducive to miniaturization and inability to share bearing materials.

In accordance with an aspect of the present invention, a cycloid speed reducer is provided. The cycloid speed reducer includes an input shaft, a rolling assembly, a first cycloid disc, a second cycloid disc, a crankshaft and at least one output disc. The input shaft is rotatable. The rolling assembly includes a wheel disc and a plurality of rolling pins. The plurality of rolling pins are disposed on the wheel disc. The first cycloid disc is disposed around the input shaft. The first cycloid disc is driven by the input shaft and rotated. The first cycloid disc includes a first tooth part contacted with the corresponding rolling pin. The second cycloid disc is disposed around the input shaft. The second cycloid disc is driven by the input shaft and rotated. The second cycloid disc includes a second tooth part contacted with the corresponding rolling pin. The first cycloid disc and the second cycloid disc are located at two opposite sides of the rolling assembly, respectively. The crankshaft includes a first concentric end, a first eccentric end, a second eccentric end and a second concentric end integrally formed as a one-piece structure and arranged sequentially. The first eccentric end is linked with the first cycloid disc. The second eccentric end is linked with the second cycloid disc. An eccentricity value is between any neighboring two of the first concentric end, the first eccentric end, the second eccentric end and the second concentric end. A diameter of the first concentric end, a diameter of the first eccentric end, a diameter of the second eccentric end and a diameter of the second concentric end are all equal. The at least one output disc is linked with the first concentric end or the second concentric end. The at least one output disc is a power output end of the cycloid speed reducer.

In accordance with another aspect of the present invention, a cycloid speed reducer is provided. The cycloid speed reducer includes an input shaft, a rolling assembly, a cycloid disc, a crankshaft and at least one output disc. The input shaft is rotatable. The rolling assembly includes a wheel disc and a plurality of rolling pins. The plurality of rolling pins are disposed on the wheel disc. The cycloid disc is disposed around the input shaft. The first cycloid disc is driven by the input shaft and rotated. The first cycloid disc includes a tooth part contacted with the corresponding rolling pin. The crankshaft includes a first concentric end, an eccentric end and a second concentric end integrally formed as a one-piece structure and arranged sequentially. The eccentric end is linked with the cycloid disc. An eccentricity value is between any neighboring two of the first concentric end, the eccentric end and the second concentric end. A diameter of the first concentric end, a diameter of the eccentric end and a diameter of the second concentric end are all equal. The at least one output disc is linked with the first concentric end or the second concentric end. The at least one output disc is a power output end of the cycloid speed reducer.

The above contents of the present invention will become more readily apparent to those ordinarily skilled in the art after reviewing the following detailed description and accompanying drawings, in which:

BRIEF DESCRIPTION OF THE DRAWINGS

FIG. 8 is a schematic cross-sectional view showing a portion of the crankshaft in the cycloid speed reducer as shown in FIG. 6.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
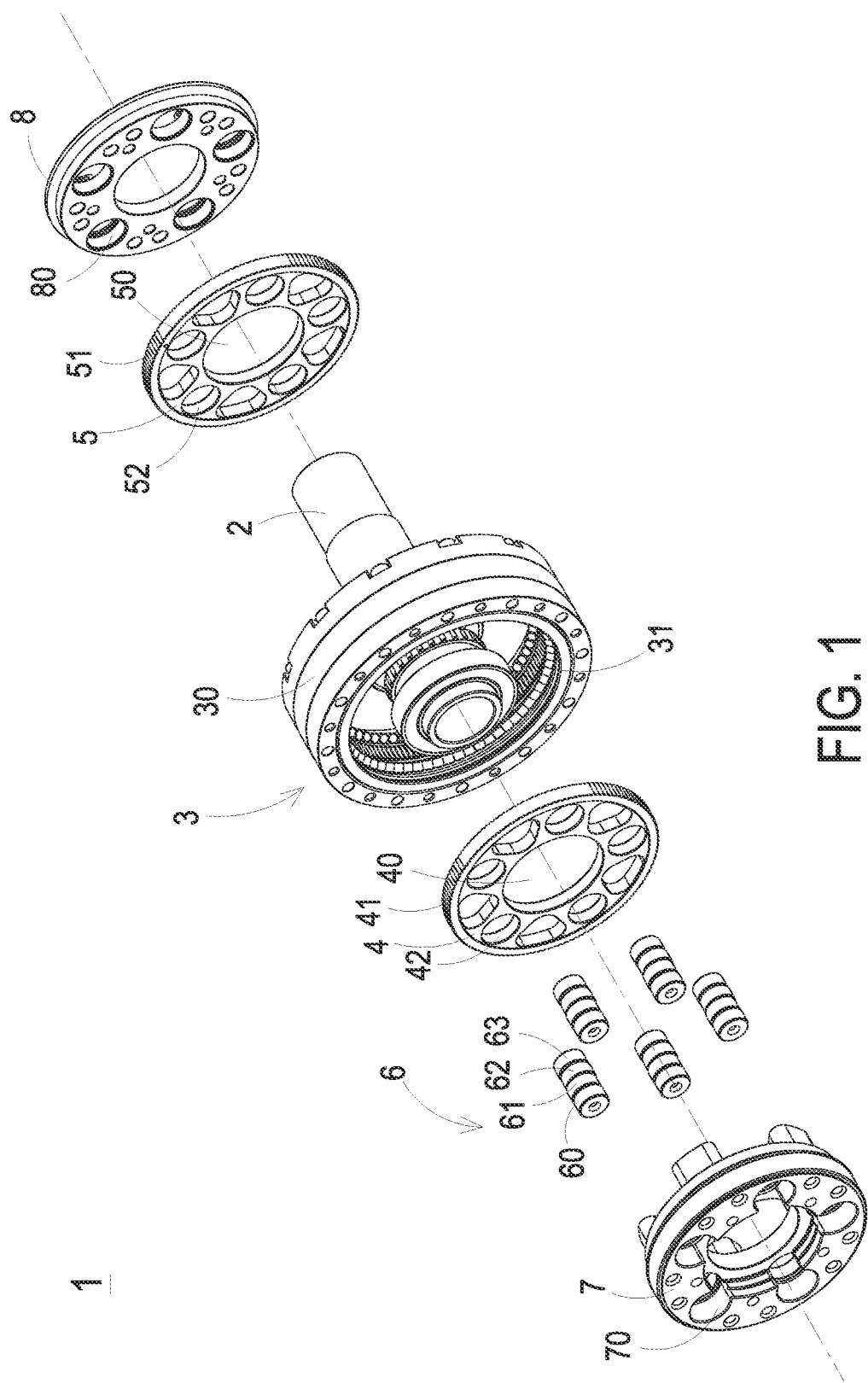
FIG. 1 is a schematic exploded view illustrating a cycloid speed reducer according to a first embodiment of the present invention.
Figure 2:
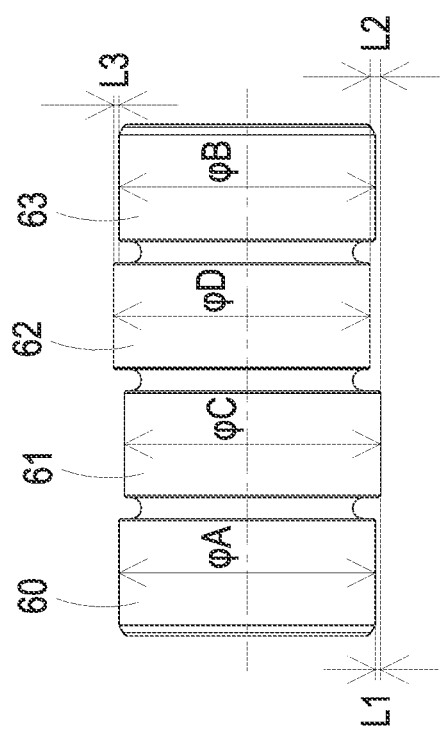
FIG. 2 is a schematic cross-sectional view showing a portion of the crankshaft in the cycloid speed reducer as shown in FIG. 1.
Figure 3:
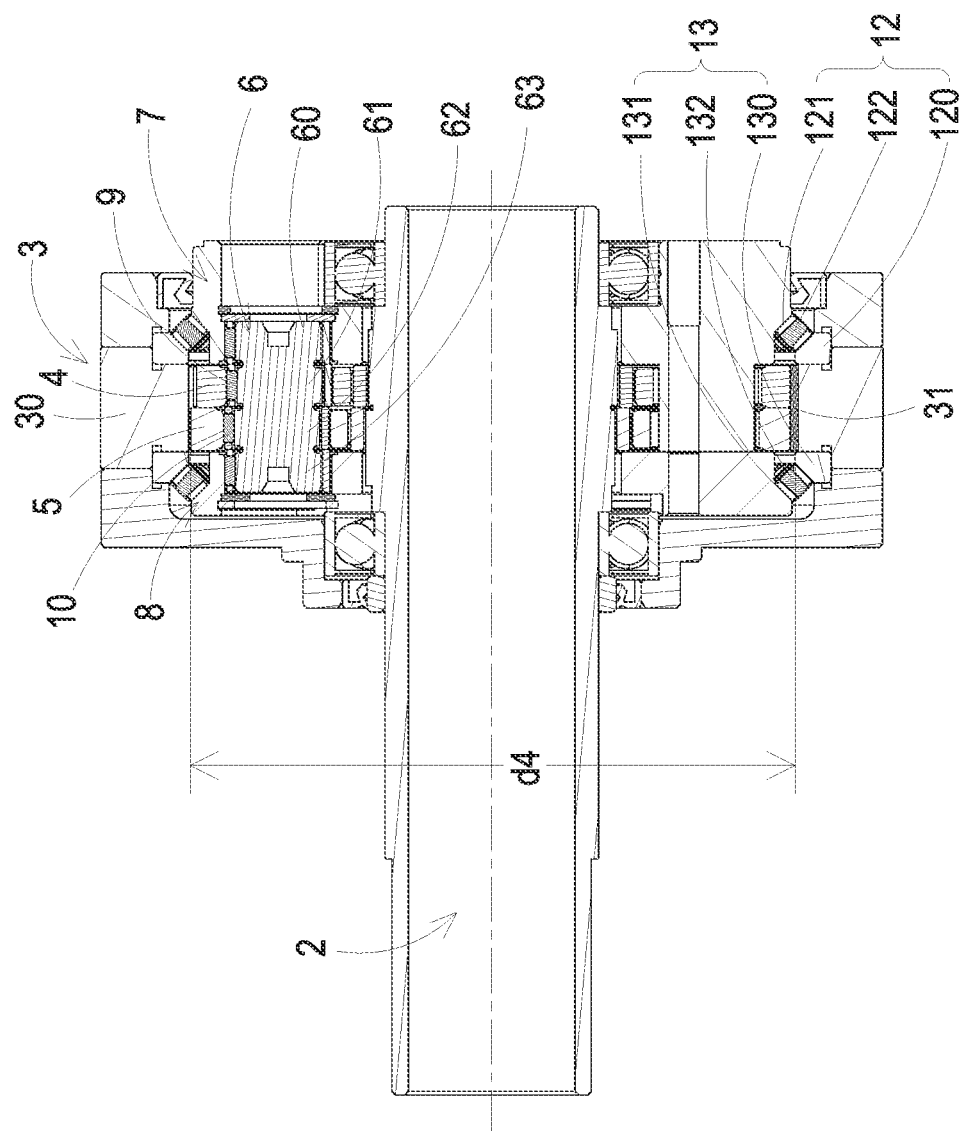
FIG. 3 is a schematic cross-sectional view illustrating the cycloid speed reducer as shown FIG. 1.
Figure 4:
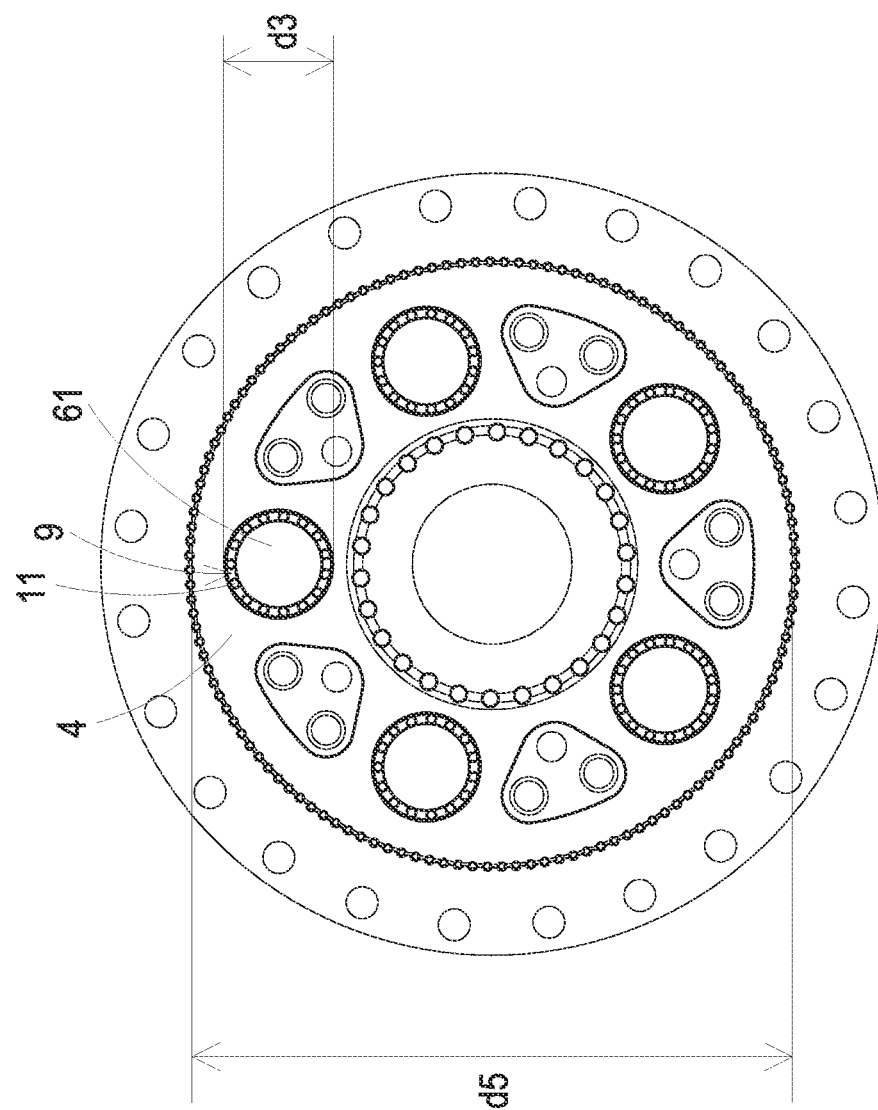
FIG. 4 is a schematic side view showing a portion of the cycloid speed reducer as shown FIG. 1.
Figure 5:
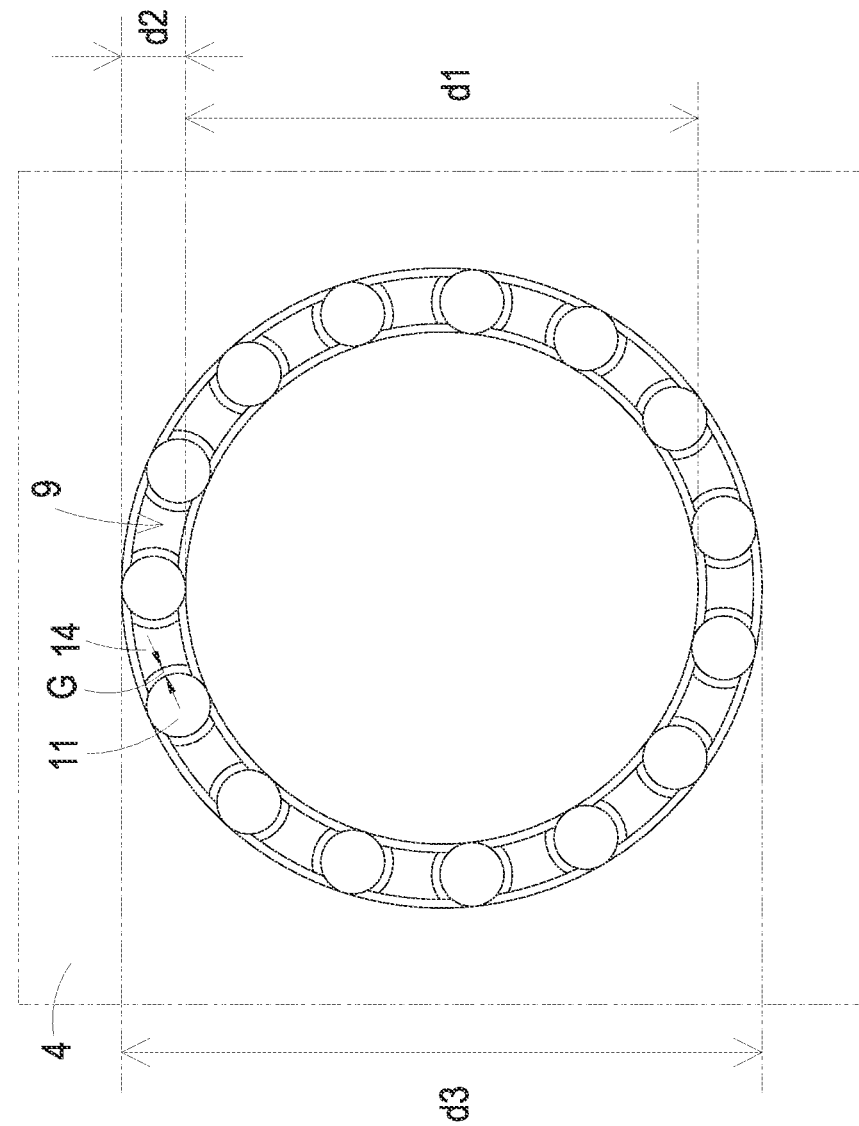
FIG. 5 is an enlarged fragmentary view of the portion of the cycloid speed reducer as shown in FIG. 4.

Please refer to FIGS. 1, 2, 3, 4 and 5. FIG. 1 is a schematic exploded view illustrating a cycloid speed reducer according to a first embodiment of the present invention. FIG. 2 is a schematic cross-sectional view showing a portion of the crankshaft in the cycloid speed reducer as shown in FIG. 1. FIG. 3 is a schematic cross-sectional view illustrating the cycloid speed reducer as shown FIG. 1. FIG. 4 is a schematic side view showing a portion of the cycloid speed reducer as shown FIG. 1. FIG. 5 is an enlarged fragmentary view of the portion of the cycloid speed reducer as shown in FIG. 4. As shown in FIGS. 1 to 5, the cycloid speed reducer 1 is applied to motors, machine tools, robotic arms, automobiles, motorcycles or other motive machines in order to provide a speed reducing function.

The cycloid speed reducer 1 includes an input shaft 2, a rolling assembly 3, a first cycloid disc 4, a second cycloid disc 5, at least one crankshaft 6 and at least one output disc.

The rolling assembly 3 includes a wheel disc 30 and a plurality of rolling pins 31. The center position of the wheel disc 30 includes an axial hole. A portion of the input shaft 2 is penetrated through the axial hole of the wheel disc 30. The wheel disc 30 is driven by the input shaft 2 and rotated. The plurality of rolling pins 31 are disposed on the wheel disc 30.

The input shaft 2 receives an input power from a motor (not shown). In response to the input power, the input shaft 2 is driven to rotate. The input shaft 2 is substantially located at the center position of the cycloid speed reducer 1.

The first cycloid disc 4 includes an axial hole 40 and at least one first tooth part 41. The axial hole 40 is located at the center position of the first cycloid disc 4 and is aligned with the installation position of the input shaft 2. A portion of the input shaft 2 is penetrated through the axial hole 40 of the first cycloid disc 4, and thus the first cycloid disc 4 is disposed around the input shaft 2. As the input shaft 2 is rotated, the first cycloid disc 4 is driven by the input shaft 2 and rotated. The at least one first tooth part 41 may be protruded from an outer periphery of the first cycloid disc 4, but not limited thereto. In addition, the at least one first tooth part 41 is contacted with the corresponding rolling pin 31.

The second cycloid disc 5 includes an axial hole 50 and at least one second tooth part 51. The axial hole 50 is located at the center position of the second cycloid disc 5 and is aligned with the installation position of the input shaft 2. A portion of the input shaft 2 is penetrated through the axial hole 50 of the second cycloid disc 5, and thus the second cycloid disc 5 is disposed around the input shaft 2. As the input shaft 2 is rotated, the second cycloid disc 5 is driven by the input shaft 2 and rotated. The at least one second tooth part 51 may be protruded from an outer periphery of the second cycloid disc 5, but not limited thereto. In addition, the at least one second tooth part 51 is contacted with the corresponding rolling pin 31.

For example, as shown in FIG. 1, the at least one output disc includes a first output disc 7 and a second output disc 8. The first output disc 7 and the second output disc 8 are located at two opposite outer sides of the cycloid speed reducer 1, respectively. Accordingly, the first cycloid disc 4 and the second cycloid disc 5 are between the first output disc 7 and the second output disc 8. At least one of the first output disc 7 and the second output disc 8 is served as a power output end of the cycloid speed reducer 1 in order to output the power.

The number of the at least one crankshaft 6 may be one or more. For example, as shown in FIG. 1, the number of the at least one crankshaft 6 is five. Each crankshaft 6 is linked with the first cycloid disc 4, the second cycloid disc 5, the first output disc 7 and the second output disc 8. Each crankshaft 6 includes a first concentric end 60, a first eccentric end 61, a second eccentric end 62 and a second concentric end 63, which are integrally formed as a one-piece structure and are arranged sequentially. The first concentric end 60 is linked with the first output disc 7. The first eccentric end 61 is linked with the first cycloid disc 4. The second eccentric end 62 is linked with the second cycloid disc 5. The second concentric end 63 is linked with the second output disc 8. Moreover, an eccentricity value is between any neighboring two of the first concentric end 60, the first eccentric end 61, the second eccentric end 62 and the second concentric end 63. Further, a diameter φA of the first concentric end 60, a diameter φC of the first eccentric end 61, a diameter φD of the second eccentric end 62 and a diameter φB of the second concentric end 63 are all equal (i.e., are all equal to a diameter of the crankshaft 6).

From the above descriptions, instead of limiting the diameter of the eccentric end of the crankshaft to be greater than the diameter of the concentric end of the crankshaft like the conventional cycloid speed reducer, the cycloid speed reducer 1 in the first embodiment of the present invention allows the first concentric end 60, the first eccentric end 61, the second eccentric end 62 and the second concentric end 63 of the crankshaft 6 to have the same diameter (i.e., φA=φC=φD=φB). Consequently, it is not necessary to increase the diameter of the first eccentric end 61 and the diameter of the second eccentric end 62, and the miniaturization of the cycloid speed reducer 1 can be realized. As mentioned above, the first concentric end 60, the first eccentric end 61, the second eccentric end 62 and the second concentric end 63 of the crankshaft 6 have the same diameter. Consequently, when the bearings are disposed around the first concentric end 60, the first eccentric end 61, the second eccentric end 62 and the second concentric end 63 of the crankshaft 6 respectively, these bearings may be designed to comply with the same specification. In this way, the component cost is reduced. Moreover, the first concentric end 60, the first eccentric end 61, the second eccentric end 62 and the second concentric end 63 of the crankshaft 6 are integrally formed as a one-piece structure. Consequently, the accuracy of the arrangement and alignment of the crankshaft 6 within the cycloid speed reducer 1 is improved.

In this embodiment, as shown in FIG. 2, the eccentricity value between the first concentric end 60 and the first eccentric end 61 is defined as a first eccentricity value L1. The eccentricity value between the second concentric end 63 and the second eccentric end 62 is defined as a second eccentricity value L2. The eccentricity value between the first eccentric end 61 and the second eccentric end 62 is defined as a third eccentricity value L3. The first eccentricity value L1 is equal to the second eccentricity value L2, and the third eccentricity value L3 is two times the first eccentricity value L1. Accordingly, it is conducive to dispose the bearings around the first concentric end 60, the first eccentric end 61, the second eccentric end 62 and the second concentric end 63 of the crankshaft 6 respectively. In addition, in this embodiment, the first concentric end 60 and the second concentric end 63 are coaxial with the crankshaft 6. The first eccentric end 61 and the second eccentric end 62 are eccentrically disposed on the crankshaft 6. The eccentric direction of the first eccentric end 61 is opposite to the eccentric direction of the second eccentric end 62.

In an embodiment, the first cycloid disc 4 further includes at least one first installation hole 42. Each first installation hole 42 is aligned with the corresponding crankshaft 6 for allowing the first eccentric end 61 of the corresponding crankshaft 6 to penetrate through. Consequently, the first eccentric end 61 of the corresponding crankshaft 6 and the first cycloid disc 4 are linked with each other. Similarly, the first output disc 7 includes at least one second installation hole 70. Each second installation hole 70 is aligned with the corresponding crankshaft 6 for allowing the first concentric end 60 of the corresponding crankshaft 6 to penetrate through. Consequently, the first concentric end 60 of the corresponding crankshaft 6 and the first output disc 7 are linked with each other. Similarly, the second cycloid disc 5 further includes at least one third installation hole 52. Each third installation hole 52 is aligned with the corresponding crankshaft 6 for allowing the second eccentric end 62 of the corresponding crankshaft 6 to penetrate through. Consequently, the second eccentric end 62 of the corresponding crankshaft 6 and the second cycloid disc 5 are linked with each other. Similarly, the second output disc 8 includes at least one fourth installation hole 80. Each fourth installation hole 80 is aligned with the corresponding crankshaft 6 for allowing the second concentric end 63 of the corresponding crankshaft 6 to penetrate through. Consequently, the second concentric end 63 of the corresponding crankshaft 6 and the second output disc 8 are linked with each other.

In addition, in an embodiment, as shown in FIGS. 3, 4 and 5, the cycloid speed reducer 1 further includes a first bearing 9 and a second bearing 10. The structure of the first bearing 9 and the structure of the second bearing 10 are the same. The first bearing 9 is disposed between the first installation hole 42 of the first cycloid disc 4 and the first eccentric end 61. The second bearing 10 is disposed between the third installation hole 52 of the second cycloid disc 5 and the second eccentric end 62. Moreover, each of the first bearing 9 and the second bearing 10 includes a plurality of output eccentric shaft needles 11. Since the first bearing 9 and the second bearing 10 have the same structure, only the output eccentric shaft needles 11 of the first bearing 9 are exemplified in FIG. 4. The plurality of output eccentric shaft needles 11 of the first bearing 9 are disposed around the main body of the first bearing 9. When the first bearing 9 is disposed between the first installation hole 42 of the first cycloid disc 4 and the first eccentric end 61, the plurality of output eccentric shaft needles 11 of the first bearing 9 are disposed around the outer ring wall of the first eccentric end 61. The plurality of output eccentric shaft needles 11 of the second bearing 10 are disposed around the main body of the second bearing 10. When the second bearing 10 is disposed between the third installation hole 52 of the second cycloid disc 5 and the second eccentric end 62, the plurality of output eccentric shaft needles 11 of the second bearing 10 are disposed around the outer ring wall of the second eccentric end 62.

Furthermore, as shown in FIG. 5, the diameter of the crankshaft 6 is d1, namely the diameter of the first concentric end 60, the diameter of the first eccentric end 61, the diameter of the second eccentric end 62 and the diameter of the second concentric end 63 are d1 (i.e., $\varphi A=\varphi C=\varphi D=\varphi B$). The diameter of each output eccentric shaft needle 11 is d2. The diameter of the first installation hole 42 and the diameter of the third installation hole 52 are both d3. The diameter d3 of the first installation hole 42 and the third installation hole 52 are equal to a sum of the diameter d1 of the second eccentric end 62 and two times of the diameter d2 of the output eccentric shaft needle 11 (i.e., $d3=d1+2d2$). Moreover, two times of the diameter d2 of the output eccentric shaft needle 11 is greater than or equal to the first eccentricity value L1 (i.e., $2d2 \geq L1$).

In an embodiment, each of the first bearing 9 and the second bearing 10 further includes a rolling pin retainer 14 configured for covering and supporting the output eccentric shaft needle 11. Since the first bearing 9 and the second bearing 10 have the same structure, only the rolling pin retainer 14 of the first bearing 9 are exemplified in FIG. 5. In addition, there is a gap G between each output eccentric shaft needle 11 and the corresponding rolling pin retainer 14 within the corresponding bearing. Therefore, under the circumstance that two times of the diameter d2 of the output eccentric shaft needle 11 is greater than or equal to the first eccentricity value L1, the first bearing 9 and the second bearing 10 are ensured to be sleeved on the eccentric ends 61 and 62, respectively.

In an embodiment, the first cycloid disc 4 and the second cycloid disc 5 may be disposed within the wheel disc 30 of the rolling assembly 3. At least a part of the first output disc 7 and at least a part of the second output disc 8 are disposed within the wheel disc 30, respectively.

In addition, the cycloid speed reducer 1 further includes a third bearing 12 and a fourth bearing 13 which are similar in structure and size. The third bearing 12 includes a bearing outer ring 120, a bearing inner ring 121 and at least one rolling pin 122. The bearing outer ring 120 is disposed on an inner wall of the wheel disc 30, and the bearing outer ring 120 and the first output disc 7 are neighboring to each other with an interval therebetween. The bearing inner ring 121 is formed by a part of the first output disc 7. The at least one rolling pin 122 is connected between the bearing outer ring 120 and the bearing inner ring 121. The fourth bearing 13 includes a bearing outer ring 130, a bearing inner ring 131 and at least one rolling pin 132. The bearing outer ring 130 is disposed on an inner wall of the wheel disc 30, and the bearing outer ring 130 and the second output disc 8 are neighboring to each other with an interval therebetween. The bearing inner ring 131 is formed by a part of the second output disc 8. The at least one rolling pin 132 is connected between the bearing outer ring 130 and the bearing inner ring 131. Moreover, the internal diameters d4 of the bearing outer rings 120 and 130 (as shown in FIG. 3) are greater than the external diameters d5 of the first cycloid disc 4 and the second cycloid disc 5 (as shown in FIG. 4), respectively.

The power transmission method of the cycloid speed reducer 1 in the first embodiment is described as follows.

Firstly, as the input shaft 2 is rotated, the input shaft 2 drives the rotations of the first cycloid disc 4 and the second cycloid disc 5. Since the first cycloid disc 4 and the second cycloid disc 5 are linked with the first eccentric end 61 and the second eccentric end 62 of the crankshaft 6 respectively, the first cycloid disc 4 and the second cycloid disc 5 drive the rotation of the crankshaft 6. Consequently, the first concentric end 60 and the second concentric end 63 of the crankshaft 6 are synchronously rotated to drive the respective rotations of the first output disc 7 and the second output disc 8. The first output disc 7 and/or the second output disc 8 are/is served as the power output end of the cycloid speed reducer 1. In some other embodiment, the first output disc 7 and/or the second output disc 8 are/is fixed, and the wheel disc 30 is served as the power output end of the cycloid speed reducer 1.

Figure 6:
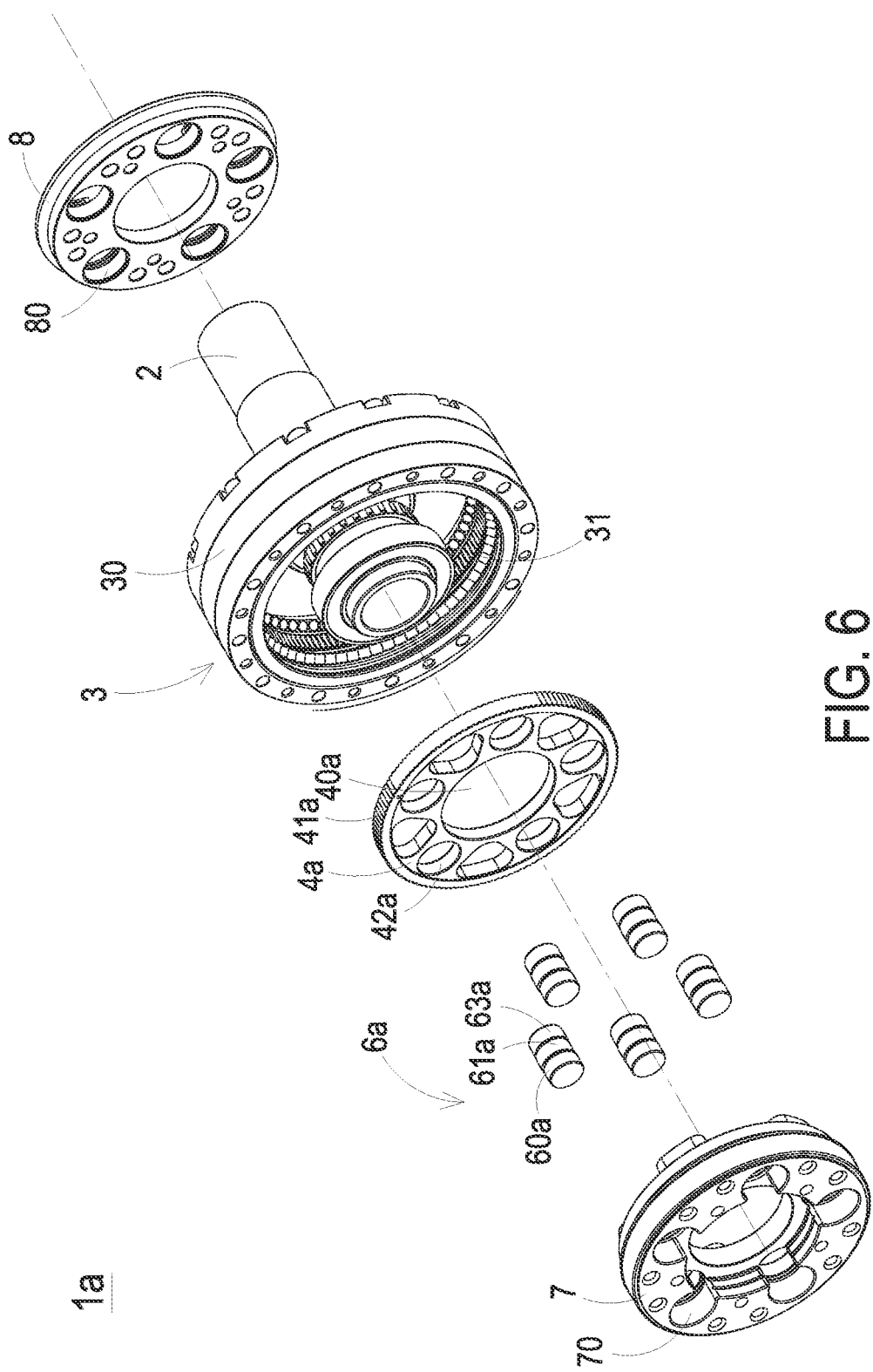
FIG. 6 is a schematic exploded view illustrating a cycloid speed reducer according to a second embodiment of the present invention.
Figure 7:
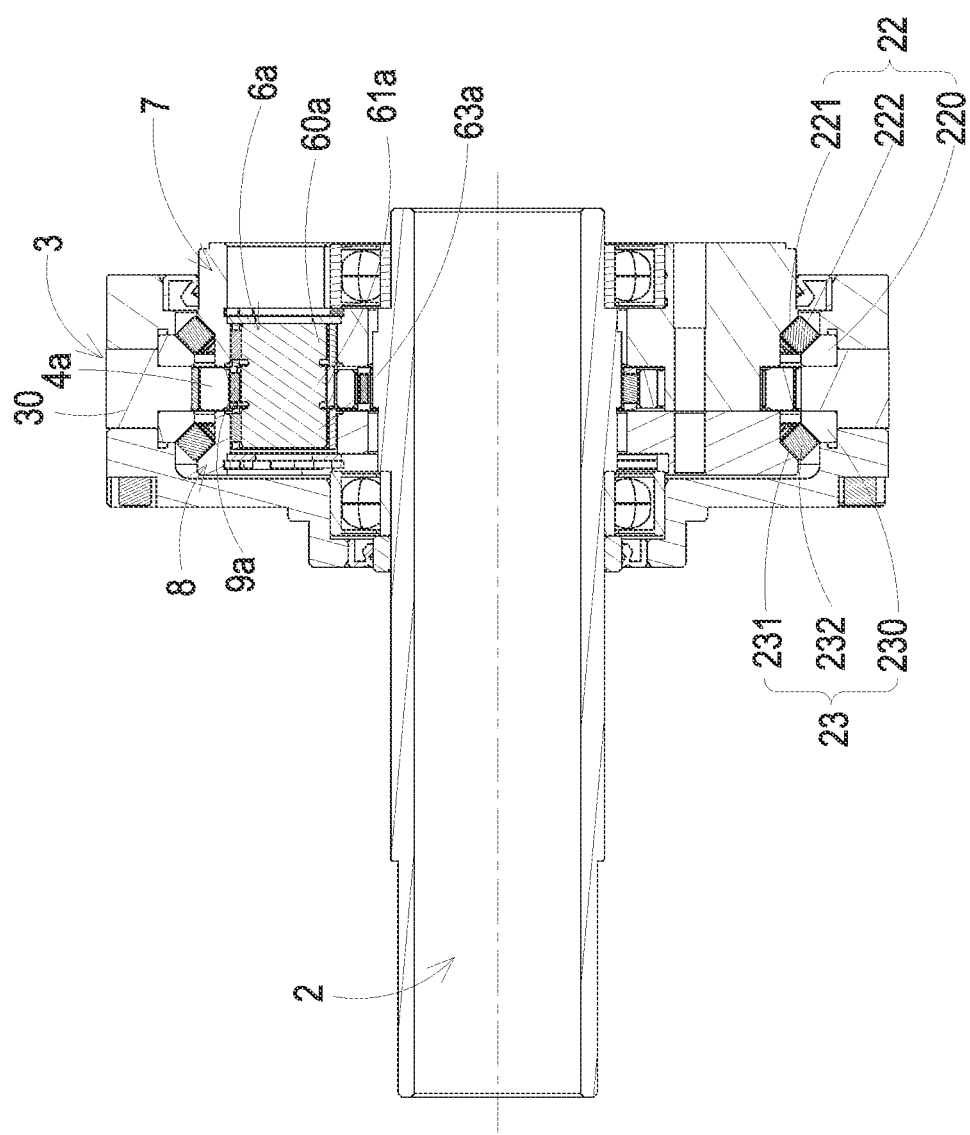
FIG. 7 is a schematic cross-sectional view illustrating the cycloid speed reducer as shown FIG. 6.

Please refer to FIGS. 6, 7 and 8. FIG. 6 is a schematic exploded view illustrating a cycloid speed reducer according to a second embodiment of the present invention. FIG. 7 is a schematic cross-sectional view illustrating the cycloid speed reducer as shown FIG. 6. FIG. 8 is a schematic cross-sectional view showing a portion of the crankshaft in the cycloid speed reducer as shown in FIG. 6. The structure of the cycloid speed reducer 1a in the second embodiment is similar to the structure of the cycloid speed reducer 1 in the first embodiment shown in FIG. 1. Therefore, the components parts and elements corresponding to those of the first embodiment are designated by identical numeral references, and detailed descriptions thereof are omitted herein. Unlike the cycloid speed reducer 1 shown in FIG. 1 including two cycloid discs, the cycloid speed reducer 1a in this embodiment includes one single cycloid disc. That is, the cycloid speed reducer 1a includes an input shaft 2, a rolling assembly 3, a cycloid disc 4a, at least one crankshaft 6a and at least one output disc.

The rolling assembly 3 includes a wheel disc 30 and a plurality of rolling pins 31. The center position of the wheel disc 30 includes an axial hole. A portion of the input shaft 2 is penetrated through the axial hole of the wheel disc 30. The wheel disc 30 is driven by the input shaft 2 and rotated. The plurality of rolling pins 31 are disposed on the wheel disc 30.

The input shaft 2 receives an input power from a motor (not shown). In response to the input power, the input shaft 2 is driven to rotate. The input shaft 2 is substantially located at the center position of the cycloid speed reducer 1a.

The cycloid disc 4a includes an axial hole 40a and at least one tooth part 41a. The axial hole 40a is located at the center position of the cycloid disc 4a and is aligned with the installation position of the input shaft 2. A portion of the input shaft 2 is penetrated through the axial hole 40a of the cycloid disc 4a, and thus the cycloid disc 4a is disposed around the input shaft 2. As the input shaft 2 is rotated, the cycloid disc 4a is driven by the input shaft 2 and rotated. The at least one tooth part 41a is protruded from an outer periphery of the cycloid disc 4a. In addition, the at least one tooth part 41a is contacted with the corresponding rolling pin 31.

For example, as shown in FIG. 6, the at least one output disc includes a first output disc 7 and a second output disc 8. The first output disc 7 and the second output disc 8 are located at two opposite outer sides of the cycloid speed reducer 1a, respectively. Accordingly, the cycloid disc 4a is between the first output disc 7 and the second output disc 8. At least one of the first output disc 7 and the second output disc 8 is served as a power output end of the cycloid speed reducer 1a in order to output the power.

The crankshaft 6a is linked with the cycloid disc 4a, the first output disc 7 and the second output disc 8. The crankshaft 6 includes a first concentric end 60a, an eccentric end 61a and a second concentric end 63a, which are integrally formed as a one-piece structure and are arranged sequentially. The first concentric end 60a is linked with the first output disc 7. The eccentric end 61a is linked with the cycloid disc 4a. The second concentric end 63a is linked with the second output disc 8. Moreover, an eccentricity value is between any neighboring two of the first concentric end 60a, the eccentric end 61a and the second concentric end 63a. Further, a diameter φA1 of the first concentric end 60a, a diameter φC1 of the eccentric end 61a and a diameter φB1 of the second concentric end 63a are all equal (i.e., are all equal to a diameter of the crankshaft 6a).

From the above descriptions, instead of limiting the diameter of the eccentric end of the crankshaft to be greater than the diameter of the concentric end of the crankshaft like the conventional cycloid speed reducer, the cycloid speed reducer 1a in the second embodiment of the present invention allows the first concentric end 60a, the eccentric end 61a and the second concentric end 63a of the crankshaft 6a to have the same diameter (i.e., φA1=φC1=φB1). Consequently, it is not necessary to increase the diameter of the eccentric end 61a, and the miniaturization of the cycloid speed reducer 1a can be realized. As mentioned above, the first concentric end 60a, the eccentric end 61a and the second concentric end 63a of the crankshaft 6a have the same diameter. Consequently, when the bearings are disposed around the first concentric end 60a, the eccentric end 61a and the second concentric end 63a of the crankshaft 6a respectively, these bearings may be designed to comply with the same specification. In this way, the component cost is reduced. Moreover, the first concentric end 60a, the eccentric end 61a and the second concentric end 63a of the crankshaft 6a are integrally formed as a one-piece structure. Consequently, the accuracy of the arrangement and alignment of the crankshaft 6a within the cycloid speed reducer 1a is improved.

In this embodiment, as shown in FIG. 8, the eccentricity value between the first concentric end 60a and the eccentric end 61a is defined as a first eccentricity value L4. The eccentricity value between the second concentric end 63a and the eccentric end 61a is defined as a second eccentricity value L5. The first eccentricity value L4 is equal to the second eccentricity value L5. Accordingly, it is conducive to dispose the bearings around the first concentric end 60a, the eccentric end 61a and the second concentric end 63a of the crankshaft 6a, respectively. In addition, in this embodiment, the first concentric end 60a and the second concentric end 63a are coaxial with the crankshaft 6a. The eccentric end 61a is eccentrically disposed on the crankshaft 6a.

In an embodiment, the cycloid disc 4a further includes at least one first installation hole 42a. Each first installation hole 42a is aligned with the corresponding crankshaft 6a for allowing the first eccentric end 61a of the corresponding crankshaft 6a to penetrate through. Consequently, the first eccentric end 61a of the corresponding crankshaft 6a and the cycloid disc 4a are linked with each other. Similarly, the first output disc 7 includes at least one second installation hole 70. Each second installation hole 70 is aligned with the corresponding crankshaft 6a for allowing the first concentric end 60a of the corresponding crankshaft 6a to penetrate through. Consequently, the first concentric end 60a of the corresponding crankshaft 6a and the first output disc 7 are linked with each other. Similarly, the second output disc 8 includes at least one fourth installation hole 80. Each fourth installation hole 80 is aligned with the corresponding crankshaft 6a for allowing the second concentric end 63a of the corresponding crankshaft 6a to penetrate through. Consequently, the second concentric end 63a of the corresponding crankshaft 6a and the second output disc 8 are linked with each other.

In addition, in an embodiment, the cycloid speed reducer 1a further includes a first bearing 9a, which is similar to the first bearing 9 shown in FIGS. 4 and 5 in structure and characteristic. Therefore, the structure of the first bearing 9a is briefly described, and the detailed structure of the first bearing 9a would not be shown in the figures. The first bearing 9a is disposed between the first installation hole 42a of the cycloid disc 4a and the eccentric end 61a. Moreover, the first bearing 9a includes a plurality of output eccentric shaft needles (not shown). The plurality of output eccentric shaft needles of the first bearing 9a are disposed around the main body of the first bearing 9a. When the first bearing 9a is disposed between the first installation hole 42a of the cycloid disc 4a and the eccentric end 61a, the plurality of output eccentric shaft needles of the first bearing 9a are disposed around the outer ring wall of the eccentric end 61a. Furthermore, the diameter of the first installation hole 42a is equal to a sum of the diameter of the eccentric end 61a and two times of the diameter of the output eccentric shaft needle. Moreover, two times of the diameter of the output eccentric shaft needle is greater than or equal to the first eccentricity value L4.

In an embodiment, the first bearing 9a further includes a rolling pin retainer (not shown) configured for covering and supporting the output eccentric shaft needle. In addition, there is a gap between each output eccentric shaft needle and the corresponding rolling pin retainer within the corresponding first bearing 9a. Therefore, under the circumstance that two times of the diameter of the output eccentric shaft needle is greater than or equal to the first eccentricity value L4, the first bearing 9a is ensured to be sleeved on the eccentric end 61a.

In an embodiment, the cycloid disc 4a may be disposed within the wheel disc 30 of the rolling assembly 3. At least a part of the first output disc 7 and at least a part of the second output disc 8 are disposed within the wheel disc 30 respectively.

In addition, similar to the third bearing 12 and the fourth bearing 13 of the cycloid speed reducer 1 shown in FIG. 2, the cycloid speed reducer 1a further includes a second bearing 22 and a third bearing 23. The second bearing 22 includes a bearing outer ring 220, a bearing inner ring 221 and at least one rolling pin 222. The bearing outer ring 220 is disposed on an inner wall of the wheel disc 30, and the bearing outer ring 220 and the first output disc 7 are neighboring to each other with an interval therebetween. The bearing inner ring 221 is formed by a part of the first output disc 7. The at least one rolling pin 222 is connected between the bearing outer ring 220 and the bearing inner ring 221. The third bearing 23 includes a bearing outer ring 230, a bearing inner ring 231 and at least one rolling pin 232. The bearing outer ring 230 is disposed on an inner wall of the wheel disc 30, and the bearing outer ring 230 and the second output disc 8 are neighboring to each other with an interval therebetween. The bearing inner ring 231 is formed by a part of the second output disc 8. The at least one rolling pin 232 is connected between the bearing outer ring 230 and the bearing inner ring 231. Moreover, the internal diameter of the bearing outer rings 220 and 230 is greater than the external diameter of the cycloid disc 4a.

The power transmission method of the cycloid speed reducer 1a in the second embodiment is described as follows. Firstly, as the input shaft 2 is rotated, the input shaft 2 drives the rotations of the cycloid disc 4a. Since the cycloid disc 4a is linked with the eccentric end 61a of the crankshaft 6a, the cycloid disc 4a drives the rotation of the crankshaft 6a. Consequently, the first concentric end 60a and the second concentric end 63a of the crankshaft 6a are synchronously rotated to drive the respective rotations of the first output disc 7 and the second output disc 8. The first output disc 7 and/or the second output disc 8 are/is served as the power output end of the cycloid speed reducer 1a. In some other embodiment, the first output disc 7 and/or the second output disc 8 are/is fixed, and the wheel disc 30 is served as the power output end of the cycloid speed reducer 1a.

From the above descriptions, the present invention provides a cycloid speed reducer. The concentric end and the eccentric end of the crankshaft of the cycloid speed reducer have the same diameter. Consequently, it is not necessary to increase the diameter of the eccentric end, and the miniaturization of the cycloid speed reducer can be realized. In addition, since the concentric end and the eccentric end of the crankshaft have the same diameter, the bearings disposed around the concentric end and the eccentric end of the crankshaft respectively may be designed to comply with the same specification. In this way, the component cost is reduced. Moreover, the concentric end and the eccentric end of the crankshaft are integrally formed as a one-piece structure. Consequently, the accuracy of the arrangement and alignment of the crankshaft within the cycloid speed reducer is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cycloid speed reducer, comprising:
an input shaft, which is rotatable;
a rolling assembly comprising a wheel disc and a plurality of rolling pins, wherein the plurality of rolling pins are disposed on the wheel disc;
a first cycloid disc disposed around the input shaft, wherein the first cycloid disc is driven by the input shaft and rotated, the first cycloid disc comprises a first tooth part contacted with the corresponding rolling pin;
a second cycloid disc disposed around the input shaft, wherein the second cycloid disc is driven by the input shaft and rotated, and the second cycloid disc comprises a second tooth part contacted with the corresponding rolling pin, wherein the first cycloid disc and the second cycloid disc are located at two opposite sides of the rolling assembly, respectively;
a crankshaft comprising a first concentric end, a first eccentric end, a second eccentric end and a second concentric end integrally formed as a one-piece structure and arranged sequentially, wherein the first eccentric end is linked with the first cycloid disc, the second eccentric end is linked with the second cycloid disc, an eccentricity value is between any neighboring two of the first concentric end, the first eccentric end, the second eccentric end and the second concentric end, and a diameter of the first concentric end, a diameter of the first eccentric end, a diameter of the second eccentric end and a diameter of the second concentric end are all equal; and at least one output disc linked with the first concentric end or the second concentric end, wherein the at least one output disc is a power output end of the cycloid speed reducer.

2. The cycloid speed reducer according to claim 1, wherein the eccentricity value between the first concentric end and the first eccentric end is defined as a first eccentricity value, the eccentricity value between the second concentric end and the second eccentric end is defined as a second eccentricity value, the eccentricity value between the first eccentric end and the second eccentric end is defined as a third eccentricity value, the first eccentricity value is equal to the second eccentricity value, and the third eccentricity value is two times the first eccentricity value.

3. The cycloid speed reducer according to claim 2, further comprising a first bearing and a second bearing, wherein each of the first bearing and the second bearing comprises a plurality of output eccentric shaft needles, and two times of a diameter of each of the plurality of output eccentric shaft needles is greater than or equal to the first eccentricity value.

4. The cycloid speed reducer according to claim 3, wherein the plurality of output eccentric shaft needles of the first bearing are disposed around an outer ring wall of the first eccentric end, and the plurality of output eccentric shaft needles of the second bearing are disposed around an outer ring wall of the second eccentric end.

5. The cycloid speed reducer according to claim 1, wherein the at least one output disc comprises a first output disc and a second output disc located at two opposite outer sides of the cycloid speed reducer, the first output disc comprises an installation hole aligned with the corresponding crankshaft for allowing the first concentric end of the corresponding crankshaft to penetrate through, and the second output disc comprises an installation hole aligned with the corresponding crankshaft for allowing the second concentric end of the corresponding crankshaft to penetrate through.

6. The cycloid speed reducer according to claim 5, further comprising a third bearing and a fourth bearing, wherein each of the third bearing and the fourth bearing comprises a bearing outer ring, the bearing outer ring of the third bearing is disposed on an inner wall of the wheel disc and is neighboring to the first output disc, the bearing outer ring of the fourth bearing is disposed on the inner wall of the wheel disc and is neighboring to the second output disc, an internal diameter of the bearing outer ring of the third bearing is greater than an external diameter of the first cycloid disc, and an internal diameter of the bearing outer ring of the fourth bearing is greater than an external diameter of the second cycloid disc.

7. A cycloid speed reducer, comprising:
an input shaft, which is rotatable;
a rolling assembly comprising a wheel disc and a plurality of rolling pins, wherein the plurality of rolling pins are disposed on the wheel disc;

a cycloid disc disposed around the input shaft, wherein the cycloid disc is driven by the input shaft and rotated, and the cycloid disc comprises a tooth part contacted with the corresponding rolling pin;

a crankshaft comprising a first concentric end, an eccentric end and a second concentric end integrally formed as a one-piece structure and arranged sequentially, wherein the eccentric end is linked with the cycloid disc, an eccentricity value is between any neighboring two of the first concentric end, the eccentric end and the second concentric end, and a diameter of the first concentric end, a diameter of the eccentric end and a diameter of the second concentric end are all equal; and at least one output disc linked with the first concentric end or the second concentric end, wherein the at least one output disc is a power output end of the cycloid speed reducer.

8. The cycloid speed reducer according to claim 7, wherein the eccentricity value between the first concentric end and the eccentric end is defined as a first eccentricity value, the eccentricity value between the second concentric end and the eccentric end is defined as a second eccentricity value, the first eccentricity value is equal to the second eccentricity value.

9. The cycloid speed reducer according to claim 8, further comprising a first bearing, wherein the first bearing comprises a plurality of output eccentric shaft needles, and two times of a diameter of each of the plurality of output eccentric shaft needles is greater than or equal to the first eccentricity value.

10. The cycloid speed reducer according to claim 9, wherein the plurality of output eccentric shaft needles are disposed around an outer ring wall of the eccentric end.

11. The cycloid speed reducer according to claim 7, wherein the at least one output disc comprises a first output disc and a second output disc located at two opposite outer sides of the cycloid speed reducer, the first output disc comprises an installation hole aligned with the corresponding crankshaft for allowing the first concentric end of the corresponding crankshaft to penetrate through, and the second output disc comprises an installation hole aligned with the corresponding crankshaft for allowing the second concentric end of the corresponding crankshaft to penetrate through.

12. The cycloid speed reducer according to claim 11, further comprising a second bearing and a third bearing, wherein each of the second bearing and the third bearing comprises a bearing outer ring, the bearing outer ring of the second bearing is disposed on an inner wall of the wheel disc and is neighboring to the first output disc, the bearing outer ring of the third bearing is disposed on the inner wall of the wheel disc and is neighboring to the second output disc, and an internal diameter of the bearing outer ring of the second bearing and an internal diameter of the bearing outer ring of the third bearing are both greater than an external diameter of the cycloid disc.

* * * * *